June 27, 1933.     A. F. CONNERY     1,915,517

REGENERATIVE REPEATER

Filed Oct. 3, 1931

INVENTOR
ALDER F. CONNERY
BY
ATTORNEY

Patented June 27, 1933

1,915,517

UNITED STATES PATENT OFFICE

ALDER F. CONNERY, OF BROOKLYN, NEW YORK, ASSIGNOR TO INTERNATIONAL COMMUNICATIONS LABORATORIES, INC., OF NEW YORK, N. Y., A CORPORATION OF NEW YORK

REGENERATIVE REPEATER

Application filed October 3, 1931. Serial No. 566,688.

This invention relates to regenerative repeaters and more especially to repeaters of the multiplex type which utilize the output of a vacuum tube to energize relays for regenerating signals received in distorted condition from a line and retransmit the signals thus regenerated into another line, or into local receiving apparatus.

One object of this invention is to provide apparatus that will respond without appreciable delay to signals that have become considerably attenuated or weakened by transmission over an incoming line, and to cause the retransmission of new signals to, likewise, be effected with a minimum of delay. Other and more important objects of this invention will be found in the subsequent description.

Figure 1:
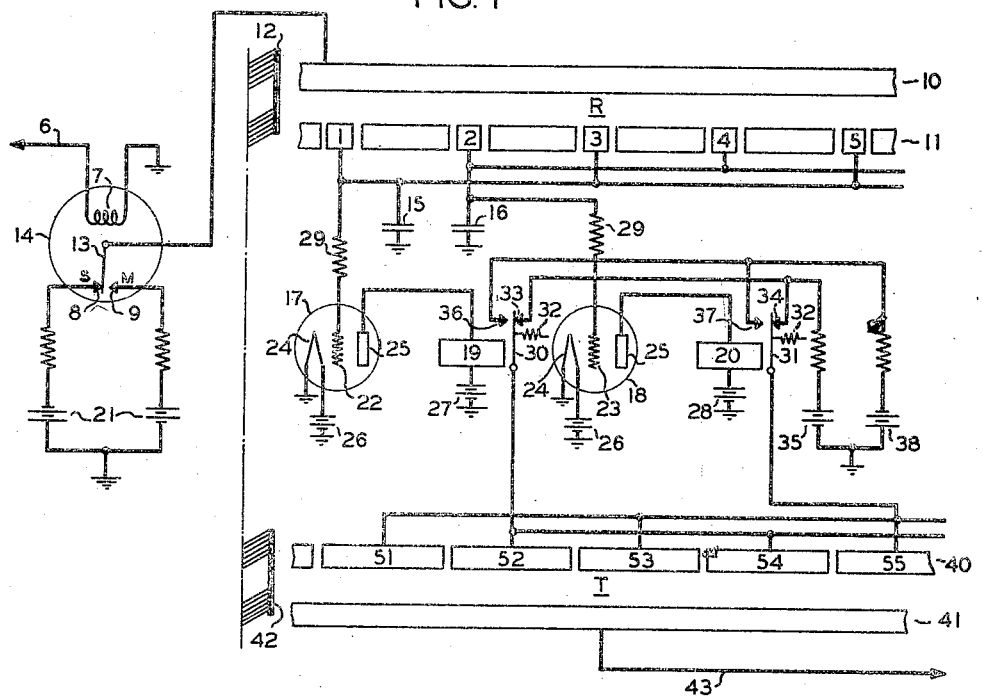
Figure 1 is a schematic view setting forth one embodiment of the invention.

Referring particularly to Figure 1 of the drawing, the line signals are received from a line section 6 and pass through winding 7 of a polarized receiving relay 14. The signals received from line section 6 energize winding 7 and thereby cause tongue 13 of the relay to make contact 8 or contact 9 in accordance with the polarity of the received signal. The tongue 13 is connected to the solid ring 10 of a distributor R. The distributor R, shown in schematic form, consists of the solid ring 10, a segmented ring 11 and a rotary brush 12 adapted to rotate in synchronism speed with the received signals. The means for maintaining the brush 12 in synchronism and in phase with the received signals is well known in the art, and since it in itself forms no part of this invention, it will not be described here. The segmented ring 11 is provided with a number of spaced short segments numbered 1 to 5 and termed pick-up segments. These segments are shortened so that only a very small part of the received signal is used.

Contacts 8 and 9 are provided with sources of negative and positive potential, respectively, in the form of batteries 21. When the tongue 13 makes one of the contacts 8 or 9, a potential is impressed upon one of two condensers 15 or 16 through the solid ring 10, brush 12 and an odd or even numbered pick-up segment. The odd numbered pick-up segments are connected in multiple and are then connected to one side of condenser 15 and to the grid 22 of a vacuum tube 17. The even numbered pick-up segments are also connected in multiple and are then connected to one side of condenser 16 and to the grid 23 of a vacuum tube 18. To insure that charges will not leak off condensers 15 and 16 too rapidly, resistances 29 are placed in circuit intermediate the grids and condensers.

Each vacuum tube comprises a grid 22 (or 23), a filament 24 and a plate 25, and suitable filament batteries 26 are provided for heating the filaments. The plate of tube 17 is connected to one terminal of the winding of a relay 19. The other terminal of this winding is connected to the positive terminal of a battery 27, which supplies the anode potential for the plate of tube 17. The plate of tube 18 is similarly connected to the winding of a relay 20 and the positive terminal of a battery 28. The negative terminals of batteries 27 and 28 are grounded.

Relays 19 and 20 are provided with tongues 30 and 31, respectively, each being biased by a suitable spring 32 into engagement with rear contacts 33 and 34, which are connected to the positive terminal of a battery 35. When either relay 19 or 20 is energized, the tongue 30 or 31 respectively makes front contact 36 or 37 each of which, in turn, are connected to the negative terminal of battery 38. The negative terminal of battery 35 and the positive terminal of battery 38 are grounded.

The tongue 30 is connected to alternate even segments, designated 52 and 54, of a ring 40 of a transmitting distributor T. This distributor consists of ring 40, a solid ring 41 and a transmitting brush 42. The tongue 31 is connected to the remaining or odd segments, designated 51, 53 and 55, of ring 40. The solid ring 41 is connected to an outgoing line section 43 or to a line associated with local receiving apparatus or both, as desired.

If, for example, in the operation of the repeater, the tongue 13 of receiving relay 14 is lying against the contact 8 at the instant brush 12 passes over segment 1, then condenser 15 will be negatively charged and a negative potential will be impressed upon grid 22 of tube 17 and the plate current in tube 17 will be reduced to such a value that relay 19 will not be sufficiently energized to attract tongue 30. The tongue 30 will then, under the bias of spring 32, make its rear contact and connect battery 35 with segment 52, so that positive or spacing current will be transmitted to line 43 for one unit of time. If, on the other hand, the tongue 13 of receiving relay 14 had been against the contact 9 at the time the brush 12 passed over segment 1, then condenser 15 would have been positively charged and a positive potential would have been impressed on grid 22 causing a relatively strong plate current to flow through the circuit including relay 19, thereby energizing relay 19 and causing tongue 30 to make front contact 36, thereby connecting battery 38 to segment 52 so that negative or marking current would be transmitted to line section 43 for one unit of time. In other words, it is only necessary that the tongue 13 of relay 14 be on the proper contact for the relatively short period of time that the brush 12 is passing over the receiving segment. The position of tongue 13 is immaterial when brush 12 is not touching a receiving segment.

Assume, for example, that when brush 12 passes over segments 1, 2, 3 and 4, the received signal will be spacing, marking, spacing, marking, respectively. When the brush 12 passes over segment 1, the condenser 15 will receive a negative charge, which, in turn, will cause grid 22 of tube 17 to become more negative than the filament. This will prevent plate current flow to such an extent that relay 19 will be unoperated. The polarity set up on segment 52 will, therefore, be positive. The segments 51 to 55 of ring 40 are transmitting segments. The brush 42 is the transmitting brush and is attached to the same arm as the receiving brush 12, so that when brush 42 finally passes over segment 52 a positive potential will be impressed upon the outgoing line section 43. However, during the time that brush 42 is passing over transmitting segment 52, the receiving brush 12 is passing over receiving segment 2 and at this moment tongue 13 of relay 14 will be lying against the positive or marking contact 9. A positive charge will, therefore, be placed upon condenser 16. The grid 23 of tube 18 will accordingly become positive and cause a relatively large plate current to flow through the tube 18 and therefore cause the energization of the storing relay 20, which will move tongue 31 to make its front or negative contact 37, and this will impress upon transmitting segment 53 a negative potential, which, in turn, will cause a negative or marking impulse to flow to the outgoing line section 43 when brush 42 passes over that segment. While brush 42 is on transmitting segment 53, the receiving brush 12 will be on receiving segment 3, which, together with all odd numbered receiving segments, is joined to the condenser 15. The tongue 13 is now lying against its spacing or negative contact 8 and will cause a negative charge to be placed upon condenser 15, and this will, as explained before, prevent a current from flowing through the vacuum tube plate circuit and winding of relay 19. Thus, the proper polarity, positive, will be set up on the transmitting segment 54, which will cause the proper current namely positive, to be transmitted to the outgoing line section 43 when the transmitting brush 42 passes over that segment.

From the above, it will be evident that all the odd numbered receiving segments, together with condenser 15, vacuum tube 17, and relay 19, will form one circuit, while the even numbered segments of the receiving distributor, together with condenser 16, vacuum tube 18, and relay 20, will form another circuit. It will also be apparent that the transmitted signals will always be of the proper length, since their length is determined by the size of the transmitting segments of ring 40 and the speed of brush 42. This repeater, therefore, regenerates the incoming signals.

The utilization of condensers and vacuum tubes to operate the storing relays serves two purposes. First, the time required to charge the condenser is much less than the time required to operate directly any relay, and the polarity of the charge which is left on the condenser will be determined by the position of the line relay at the instant the receiving brush 12 is about to leave the receiving segment. Second, the condenser will hold its charge a sufficient time to permit the receiving brush 12 to cover the length of the two segments without appreciable change in the grid potential of the vacuum tube, so that no special auxiliary locking relays or locking circuits are necessay to maintain the tongues of relays 19 and 20 to the position in which they were initially moved due to the potential applied to tongue 13 of relay 14 as the result of an incoming signal.

Figure 2:
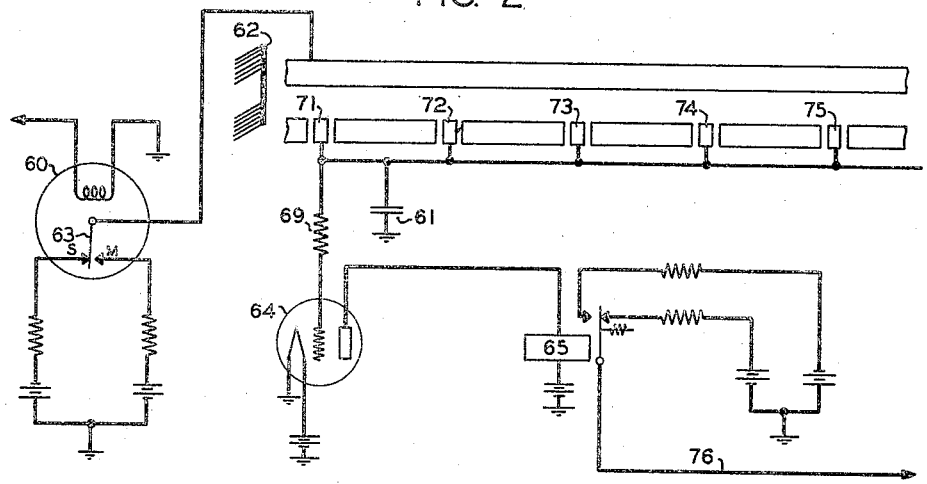
Figure 2 is a similar view of another embodiment of the invention.

Referring to Figure 2, wherein another embodiment of the invention is illustrated, a line relay 60 is actuated by received signals. Shortened receiving segments, designated 71 to 75, are all joined in parallel to condenser 61. When receiving brush 62 passes over the receiving segments, the condenser 61 will receive either a positive or a negative charge, depending upon the position of tongue 62 of the relay 60. If the charge is positive, then the grid of the vacuum tube 64 will become positive, thus permitting plate current to flow through the winding of a relay 65. Relay 65 will therefore attract its armature and negative potential will be impressed on an outgoing line 76. A resistance 69 is inserted in circuit intermediate the condenser 61 and the grid of tube 64 to prevent the charge from leaking off the condenser too rapidly, especially when the grid is positively charged.

If, on the other hand, the charge is negative, then the grid of tube 64 will become negative, relay 65 will be de-energized and positive potential will be impressed upon outgoing line section 76.

The charging of condenser 61 can occur only at the time the receiving brush 62 is passing over the shortened receiving segments. The length of each repeated signal is determined by the distance from one receiving segment to the next and by the speed of brush 62.

What is claimed is:

1. Repeating apparatus connected intermediate two line sections for regenerating impulses received from one line section and impressing said regenerated impulses on the other line section, comprising a polarized relay controlled by impulses received from said one line section, a non-polarized relay, a circuit connecting said relays, a rotary distributor and a vacuum tube in said circuit intermediate said relays, a condenser in the input circuit of said vacuum tube for maintaining the operating point on the characteristic curve of said vacuum tube at a relatively fixed position for a predetermined time interval, said point being determined by the polarity of the received impulses, and thereby controlling the operation of said non-polarized relay and in consequence thereof the impression of impulses on said other line section in accordance with the impulses received over said one line section.

2. Repeating apparatus connected intermediate two line sections for regenerating impulses received from one line section and impressing such regenerated impulses on the other line section comprising a rotary distributor operable synchronously with the received impulses, a polarized relay operable in response to received impulses for impressing potentials upon said distributor in accordance with received impulses, a non-polarized relay, a circuit connecting said relays and including therein said distributor, a vacuum tube connected intermediate the distributor and the non-polarized relay and a condenser connected to said circuit intermediate the distributor and the tube for controlling the plate current through said tube and in consequence thereof the operation of the non-polarized relay and the impression of impulses on said other line section in accordance with those transmitted over said one line section.

3. In a repeater system, a pair of relays, each relay comprising a winding, a pair of contacts and a movable tongue adapted to engage said contacts, a source of positive potential for one of each pair of contacts and a source of negative potential for the other of each pair of contacts, a circuit for connecting the tongue of one relay to the winding of the other, a distributor operable synchronously with received impulses, a potential controlled receiving device in series in said circuit and a condenser permanently connected to said receiving device for controlling the operation of one relay in response to the operation of the other.

4. In a repeater system incoming and outgoing line sections and repeater apparatus connected intermediate said line sections comprising sources of different potentials, a rotary distributor operable in synchronism and in phase with signal impulses received from said incoming line section, relaying means responsive to signal impulses from said incoming line section and in accordance with changes of polarity of said signal impulses for impressing changes of one of said different potentials on said distributor, a relay for impressing signal impulses upon said outgoing line section, a circuit connecting said distributor and said relay and including therein a potential controlled receiving device for controlling the operation of said relay and a condenser connected to said circuit intermediate said distributor and said receiving device for controlling the operation of said receiving device in accordance with the changes impressed upon said distributor.

5. In combination, a distributor having segmented receiving and retransmitting rings, a line, a polarized relay in said line for impressing impulses on the segments of said receiving rings in accordance with the polarity of received signal impulses, a thermionic valve having its input in circuit with predetermined segments of said receiving rings, and a non-polarized relay in circuit with the output of said thermionic valve for impressing regenerated signal impulses on predetermined segments of said retransmitting rings.

6. In combination, a distributor having segmented receiving and retransmitting rings, a line, a polarized relay in said line for impressing impulses on the segments of said receiving rings in accordance with the polarity of received signal impulses, a thermionic valve having its input in circuit with predetermined segments of said receiving rings, a condenser in shunt with the input of said valve, and a non-polarized relay in circuit with the output of said thermionic valve for impressing regenerated signal impulses on predetermined segments of said retransmitting rings.

7. A telegraph repeater comprising an incoming line, an outgoing line, a distributor having a segmented and an unsegmented ring, a polarized relay responsive to received signals for applying a potential to said unsegmented ring determined by the polarity of the received signals, a circuit associated with predetermined segments of the segmented ring and comprising a vacuum tube having an input and output circuit the input circuit being shunted by a condenser, a synchronously driven brush for periodically completing said input circuit and thereby causing the current in the output circuit of said vacuum tube to vary in a predetermined manner in accordance with the polarity of received signals, and a relay in the output circuit of said tube responsive to variations in the current in said output circuit for retransmitting the received signals over the outgoing line.

In witness whereof, I hereunto subscribe my name this 1st day of October 1931.

ALDER F. CONNERY.